United States Patent
Dhanoa

(10) Patent No.: US 7,899,957 B1
(45) Date of Patent: Mar. 1, 2011

(54) MEMORY CONTROLLER HAVING A BUFFER FOR PROVIDING BEGINNING AND END DATA

(75) Inventor: Kulwinder Dhanoa, London (GB)

(73) Assignee: Altera Corporation, San Jose, CA (US)

( * ) Notice: Subject to any disclaimer, the term of this patent is extended or adjusted under 35 U.S.C. 154(b) by 70 days.

(21) Appl. No.: 10/749,910

(22) Filed: Dec. 30, 2003

(51) Int. Cl.
G06F 13/28 (2006.01)
G06F 3/00 (2006.01)
G06F 5/00 (2006.01)
G06F 13/36 (2006.01)

(52) U.S. Cl. .................. 710/52; 710/22; 710/23; 710/24; 710/25; 710/26; 710/27; 710/28; 710/308

(58) Field of Classification Search .......... 710/29, 710/52, 35–36, 107, 112, 22–28, 308
See application file for complete search history.

(56) References Cited

U.S. PATENT DOCUMENTS

| | | | | |
|---|---|---|---|---|
| 5,335,326 A | * | 8/1994 | Nguyen et al. | 710/306 |
| 5,581,530 A | * | 12/1996 | Iizuka et al. | 369/93 |
| 6,279,064 B1 | * | 8/2001 | Bronson et al. | 710/112 |
| 6,499,077 B1 | * | 12/2002 | Abramson et al. | 710/305 |
| 6,816,923 B1 | * | 11/2004 | Gray et al. | 710/25 |
| 6,859,848 B2 | * | 2/2005 | Kuronuma et al. | 710/22 |
| 6,950,884 B2 | * | 9/2005 | Becker et al. | 710/22 |
| 6,959,374 B2 | * | 10/2005 | Schulz | 711/213 |
| 2003/0131162 A1 | * | 7/2003 | Secatch et al. | 710/52 |

OTHER PUBLICATIONS

"Microsoft Computer Dicitonary," 2002, p. 469.*

* cited by examiner

Primary Examiner—Chun-Kuan Lee
(74) Attorney, Agent, or Firm—Ropes & Gray LLP

(57) ABSTRACT

A memory controller, such as a SDRAM controller, controls the way in which data is retrieved, in order to make more efficient use of the bandwidth of the memory data bus. More specifically, when a memory access request requires multiple data bursts on the memory bus, the SDRAM controller stores the data from the multiple data bursts in respective buffers. Data is then retrieved from the buffers such that data is read from a part of the first buffer, then from the other buffers, and finally from the remaining part of the first buffer. Storing the required data in the remaining part of the first buffer avoids the need to occupy the memory bus with a new data burst.

16 Claims, 5 Drawing Sheets

MEMORY CONTROLLER HAVING A BUFFER FOR PROVIDING BEGINNING AND END DATA

TECHNICAL FIELD OF THE INVENTION

This invention relates to a memory controller, and in particular to a controller for a SDRAM (Synchronous Dynamic Random Access Memory) device, although the invention is also applicable to other types of memory, and to a method of operation of a memory controller.

BACKGROUND OF THE INVENTION

Computer systems must be provided with sufficient data storage capacity to operate correctly. This data storage capacity is typically provided as Random Access Memory (RAM), and SDRAM is a common form of RAM.

Accesses to a memory device, such as a SDRAM integrated circuit, are performed by a SDRAM controller. The SDRAM controller is connected to the SDRAM by means of a memory data bus, and the SDRAM controller must operate as far as possible to make efficient use of the bandwidth of the memory bus, in order to maximise the overall rate at which data can be transferred from the memory device.

Access requests received by a SDRAM controller will specify the amount of data to be retrieved from the SDRAM device. Data is received from the SDRAM device in bursts, with each burst containing a fixed amount of data, and occupying the memory bus for a corresponding fixed time period. In the case of a request to read data from the memory device, the access request will also specify whether it is a wrapping read request or an incrementing read request.

In an incrementing read request, the data to be read from the memory device is stored at memory locations in the memory device, with the addresses of those memory locations continually increasing. In a wrapping read request, the data to be read from the memory device is stored at memory locations in the memory device, with the addresses of those memory locations returning to near the start point towards the end of the read operation.

In a conventional system, this has the consequence that only a part of the data returned from the memory device in the first data burst is passed to the requesting device, and that the same data burst is requested again at the end of the read operation to allow the remaining data to be passed to the requesting device.

This results in inefficient usage of the available bandwidth of the memory bus.

SUMMARY OF THE INVENTION

It is an object of the present invention to ensure efficient use of the bandwidth of the memory data bus, when dealing with a wrapping read request.

More specifically, according to a first aspect of the present invention, when a memory access request requires multiple data bursts on the memory bus, the SDRAM controller stores the data from the multiple data bursts in respective buffers. Data is then retrieved from the buffers such that data is read from a part of the first buffer, then from the other buffers, and finally from the remaining part of the first buffer. Storing the required data in the remaining part of the first buffer avoids the need to occupy the memory bus with a new data burst.

This has the advantage that the overall performance of the computer system is improved since a higher bandwidth can be achieved on the memory data bus, thereby allowing the memory to be used more efficiently.

DETAILED DESCRIPTION OF PREFERRED EMBODIMENTS

Figure 1:
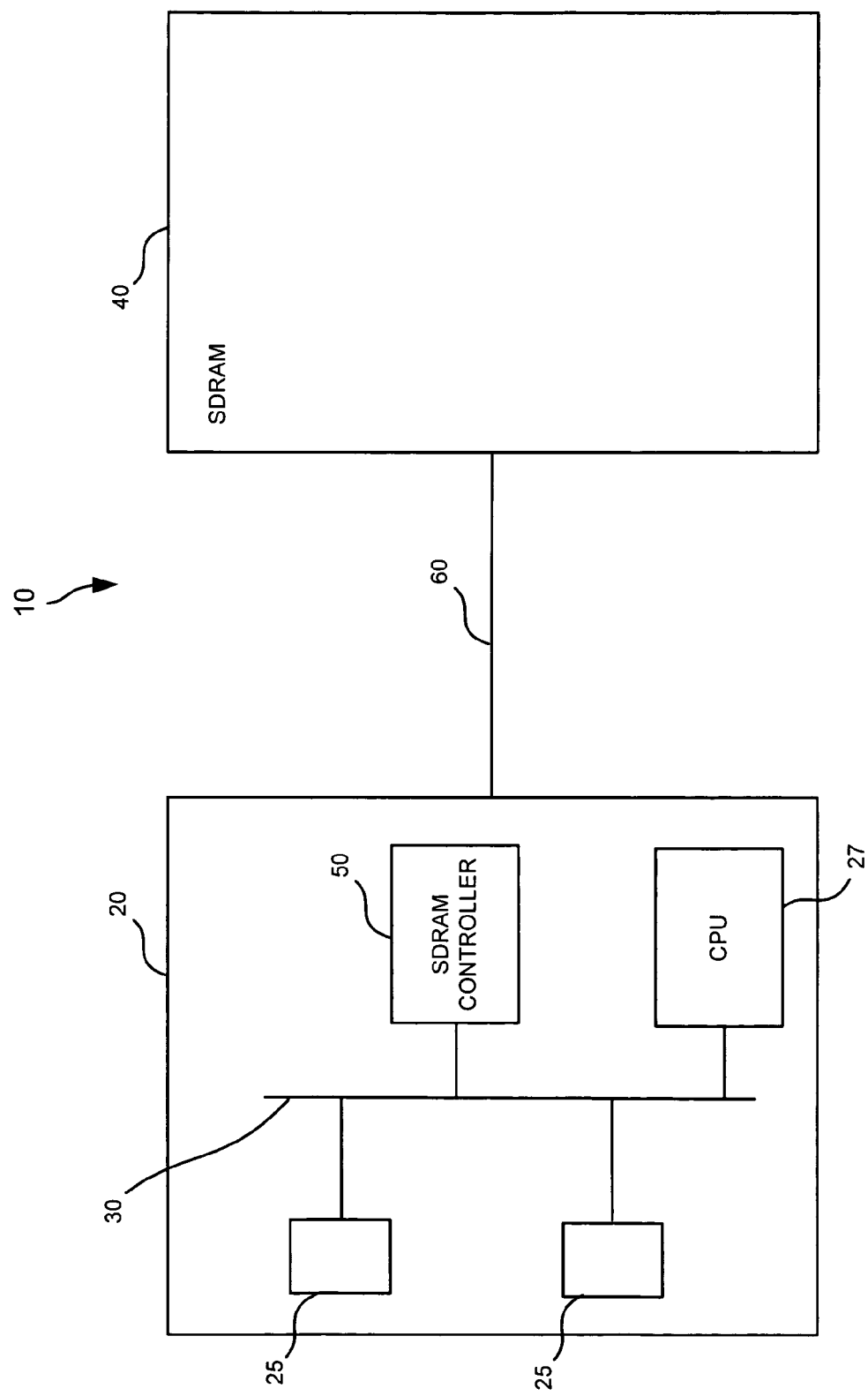
FIG. 1 is a block schematic diagram of a computer system in accordance with the present invention.

FIG. 1 is a block schematic diagram of a computer system 10. The general form of the system 10 is conventional, and will be described herein only to the extent necessary for a complete understanding of the present invention.

In the illustrated embodiment, the system 10 includes an application-specific integrated circuit (ASIC) 20, which includes various modules 25, such as a processor core (CPU) 27. These modules are interconnected by a bus 30, which may advantageously be an Advanced High-performance Bus (AHB), but which can be any convenient form of bus.

However, the invention is not limited to such a structure. The invention is also applicable to a device such as a programmable logic device (PLD) or field programmable gate array (FPGA), which can then be configured to contain multiple modules which act as bus masters. The device may then, but need not, contain an embedded processor.

Connected to the ASIC 20 is a memory chip 40, in the form of a Synchronous Dynamic Random Access Memory (SDRAM).

Accesses to the SDRAM 40 from the ASIC 20 are performed by a specific SDRAM controller 50 connected to the bus 30 in the ASIC 20.

Again, the invention is not limited to such a structure. The SDRAM controller 50 may be integrated with the bus masters in a single device, or may be provided as a separate device.

The SDRAM controller 50 is connected to the SDRAM 40 by way of a memory bus 60.

Figure 2:
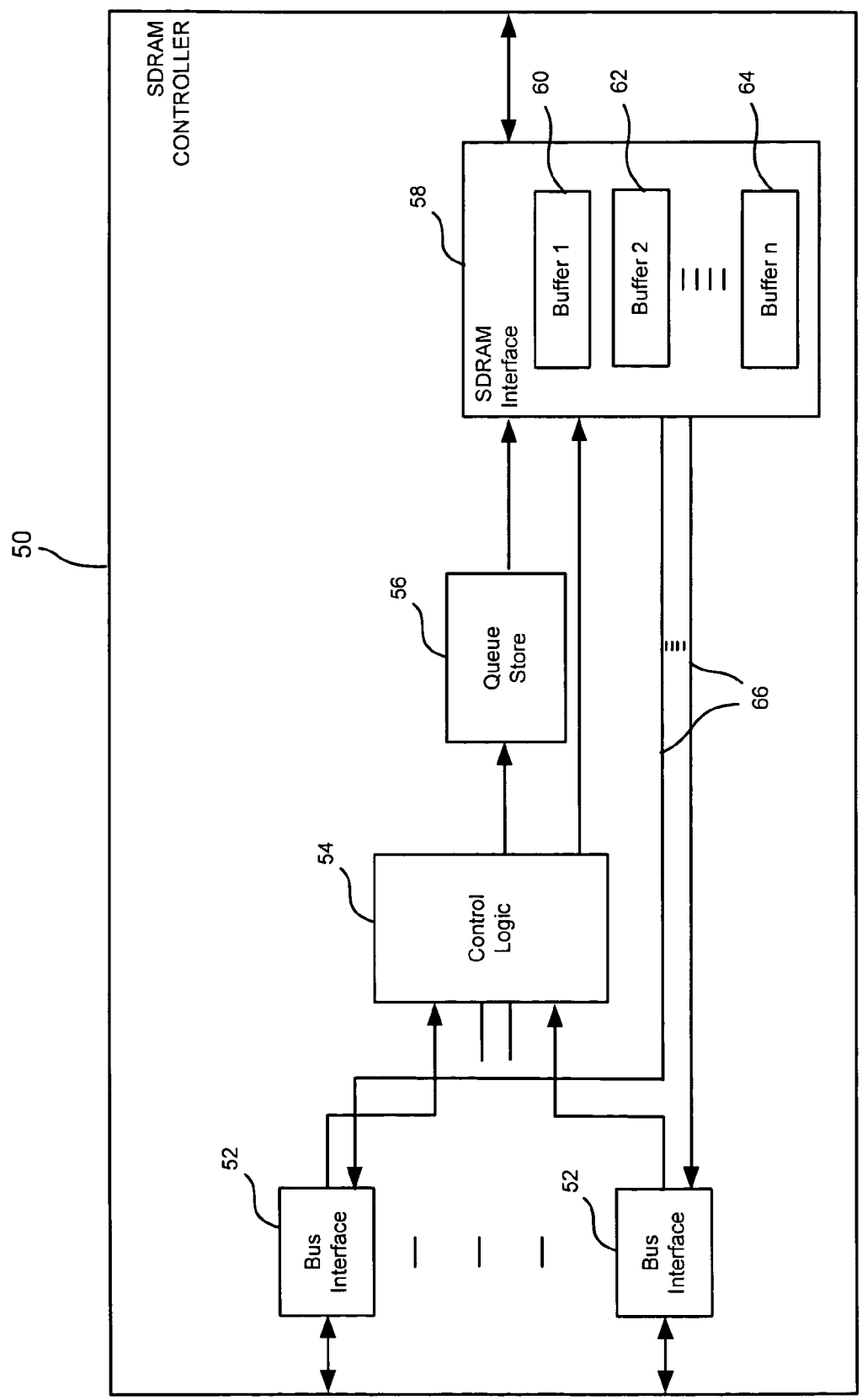
FIG. 2 is a block schematic diagram of a SDRAM controller in the computer system of FIG. 1.

FIG. 2 is a block schematic diagram, showing the form of the SDRAM controller 50.

The SDRAM controller 50 is shown in FIG. 2, and described herein, only to the extent required for an understanding of the present invention. Other features of the SDRAM controller, which are not required for that purpose, will not be described, and may be assumed to be generally conventional, as known to the person of ordinary skill in the art.

In the illustrated embodiment, the SDRAM controller 50 has multiple bus interface blocks 52, for connection to respective bus master devices. For example, in the system shown in FIG. 1, there may be one bus interface 52 allocated for connection to each of the modules 25 and the CPU 27. However, in other embodiments of the invention, there may be only one such bus interface block.

Memory access requests, received by the SDRAM controller 50 at the bus interface blocks 52, are passed to a control logic block 54, the operation of which is described more fully below.

Although FIG. 2 shows the control logic block 54 as being separate from the bus interface blocks 52, some or all of the functionality of the control logic block 54, as described below, can instead be provided in the bus interface blocks.

After processing in the control logic block 54, the memory access requests are placed in a queue in a queue store block 56, which may for example take the form of a first-in, first-out memory. The memory access requests from the queue are then passed in turn to a SDRAM interface block 58.

The SDRAM interface block 58 contains multiple buffers, namely a first buffer 60, a second buffer 62, and so on, up to an nth buffer 64. Data retrieved from the memory device is stored in the buffers 60, 62, 64 under the control of the control logic 54, as will be described in more detail below, and returned to the requesting device via the respective bus interface 52, over a corresponding data line 66.

Figure 3:
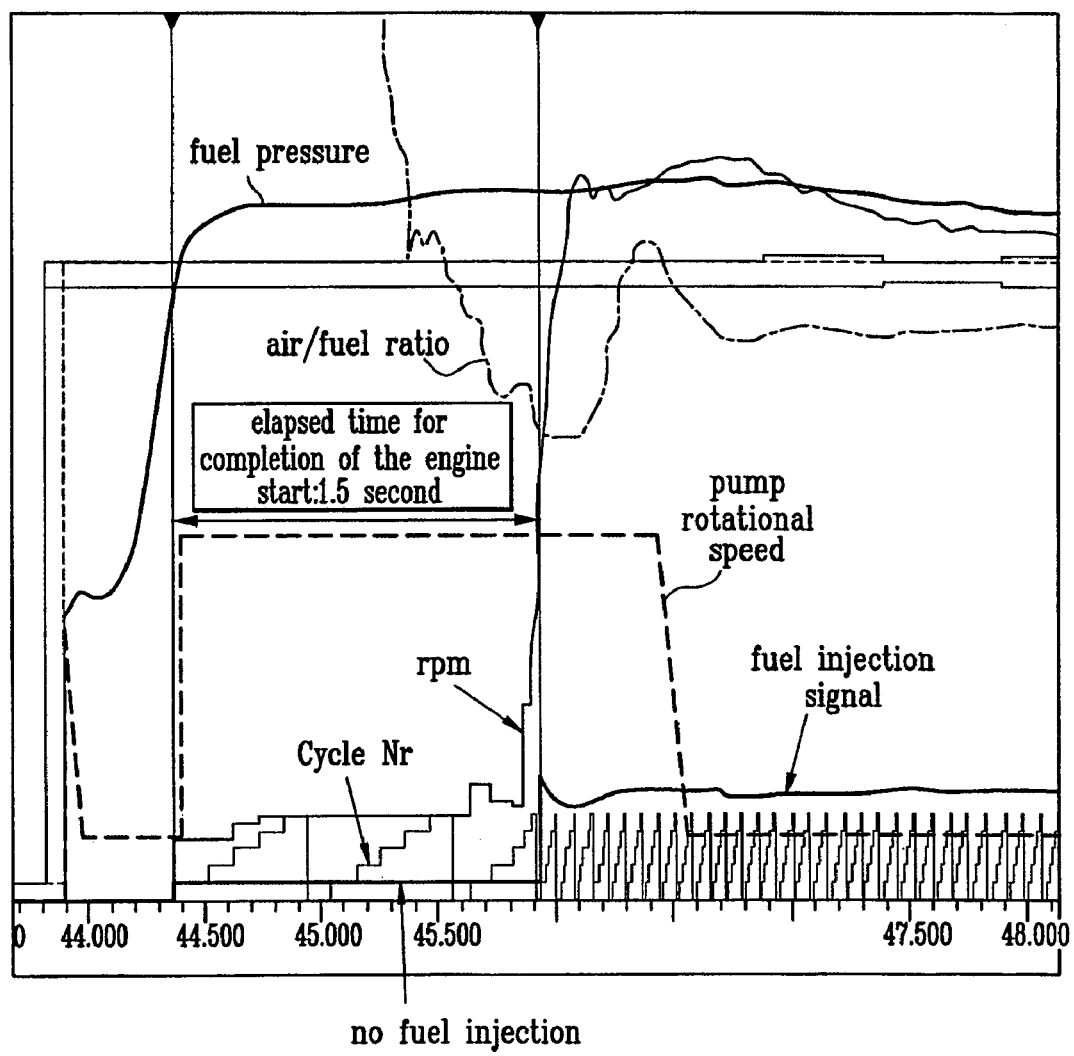
FIG. 3 is a flow chart illustrating a method in accordance with the present invention.

FIG. 3 is a flow chart, illustrating a method performed in the logic of the SDRAM controller 50, according to an aspect of the present invention.

The process starts at step 300, when a read access request is received at a bus interface 52 from one of the master devices.

The read access request indicates the amount of required data with reference to the properties of the AHB bus 30, namely the burst length, which is a feature of the bus protocol, and the AHB word size, which can be less than or equal to the width of the bus. The read access request also indicates the burst type, i.e. whether a wrapping burst or an incrementing burst is required.

Also in step 300, the control logic 54 reads the starting address of the request, that is, the address within the SDRAM 40 from which data is first to be retrieved.

In step 302, the control logic 54 determines the requested burst type, i.e., whether a wrapping burst is required. If it is determined in step 302 that a wrapping burst is not required, that is, that an incrementing burst is required, the process passes to step 304. In step 304, the request is processed. It will be appreciated that step 304 does not show in detail the way in which the request is processed, but this can be generally conventional, as understood by a person of ordinary skill in the art. Since a description of this process is not necessary for an understanding of the present invention, a more detailed description is not required.

If it is determined in step 302 that a wrapping burst is required, the process passes to step 306. In step 306, the control logic 56 then calculates the number of SDRAM bursts required to fulfil the access request.

For example, if the AHB word size is 64 bits, and the AHB burst length is 16, while the SDRAM word size is 32 bits, and the SDRAM burst length is 8, then four SDRAM bursts are required to fulfil the access request.

As another example, again taking the SDRAM word size to be 32 bits, and the SDRAM burst length to be 8, if the AHB word size is 32 bits, and the AHB burst length is 8, then one SDRAM burst is required to fulfil the access request.

Next, in step 308, the control logic 54 assigns one of the buffers 60, 62, 64 in the SDRAM interface 58 to each of the required SDRAM bursts.

In step 310, the separate read requests for each required SDRAM burst, including the respective starting addresses, are then placed into a queue of access requests in the queue store 56 of the SDRAM controller 50. The stored access requests are then handled in turn by the SDRAM interface 58.

As is known to the person skilled in the art, the control logic 56 may also, in addition to the processes described herein, apply a form of prioritisation to the access requests when placing them into the queue of access requests in the queue store 56. For example, access requests received on different bus interfaces 52 may be given different priorities.

In addition, or alternatively, access requests received on different bus interfaces 52 may be prioritised in a way which maximises the efficiency of use of the memory bus 60. For example, opening a page of the SDRAM to process an access request results in a delay in processing. Therefore, it is advantageous if access requests relating to the same page of the SDRAM can be queued consecutively.

In step 312, the queued memory bus access requests, relating to the multiple SDRAM bursts required to fulfil a wrapping burst request from a bus interface 52, reach the head of the queue. At this point, the data is retrieved from the memory 40 over the memory bus 60, with the data retrieved in each of the data bursts being stored in the allocated one of the buffers 60, 62, 64.

Thus, in the case where the control logic 54 determines that a particular number, n, of SDRAM bursts are required, data from the first data burst is stored in the first buffer 60, data from the second data burst is stored in the second buffer 62, and so on, until data from the nth data burst is stored in the nth buffer 64.

Finally, when enough SDRAM read bursts have been performed to retrieve all of the data requested in the access request received on the bus interface 52, no additional data need be retrieved.

Then, in step 314, the data stored in the buffers 60, 62, 64 is returned to the relevant bus interface 52 on the corresponding read data line 66.

Figure 4:
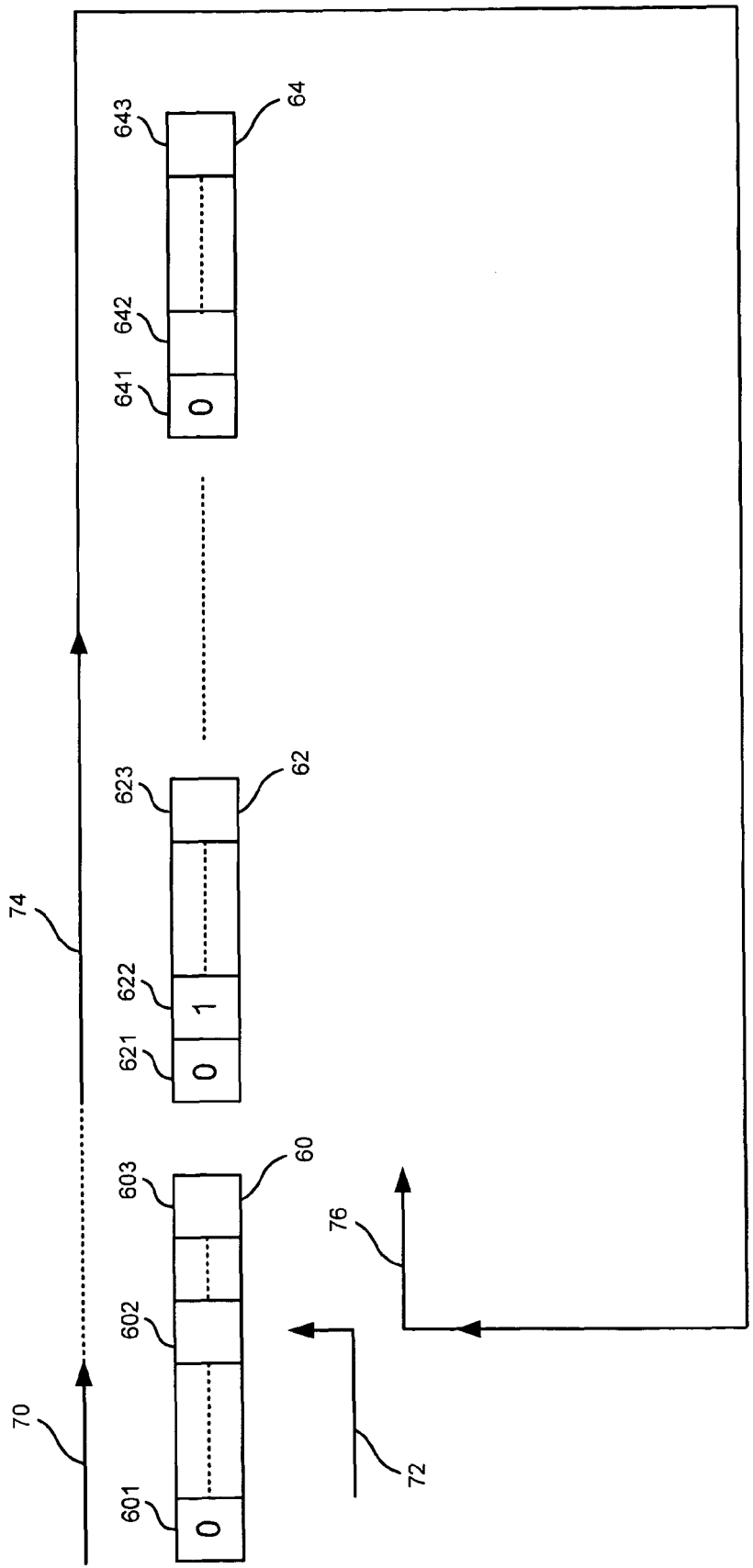
FIG. 4 schematically illustrates the storage of data in an interface of the SDRAM controller of FIG. 2.

FIG. 4 illustrates the way in which data may be stored in, and subsequently read out of, the buffers 60, 62, 64, in steps 312 and 314 of FIG. 3, in this preferred embodiment of the invention.

As described above, the data from the first SDRAM data burst is stored in the first buffer 60, data from the second data burst is stored in the second buffer 62, and so on, until data from the nth data burst is stored in the nth buffer 64. The SDRAM interface 58 is provided with enough read buffers that it can store data for the maximum possible fixed length AHB transfer. Each of the read buffers 60, 62, 64 is divided into sub-buffers. For example, FIG. 4 shows sub-buffers 601, 602, 603 in the first buffer 60, sub-buffers 621, 622, 623 in the second buffer 62 and sub-buffers 641, 642, 643 in the nth buffer 64. Each of the sub-buffers is able to hold one data beat making up a SDRAM burst.

Depending on the AHB start address, and the relationship between the AHB address at which the request will wrap and the SDRAM burst address boundaries, the first SDRAM data burst may contain the data required at the end of the request, as well as the data required at the start.

When data is to be returned to the requesting device, over the respective data line 66, data is first read out of successive sub-buffers 601 in the first buffer 60, as shown by the solid arrow 70. The controller keeps track of the AHB address, and knows the relationship between the AHB address and the SDRAM address. As a result, it is able to determine when the next item of data to be returned comes from the second SDRAM burst. At that point, that data must be retrieved from the second buffer 62.

At that time, the control logic 54 records the value of a pointer 72, indicating the sub-buffer 602 from which data was next to be retrieved.

Data is then read out of successive sub-buffers 621, 622, . . . , 623 in the second buffer 62, as shown by the solid arrow 74, and then from the other buffers allocated to this read request, until the nth buffer 64 is reached, and data is read out of successive sub-buffers 641, 642, ..., 643 in the nth buffer 64.

When all of the data has been read from the nth buffer 64, and the requesting device is still requesting more data, (that is, the address has wrapped), the control logic returns to the sub-buffer 602 indicated by the pointer 72. Data is then read out from the first buffer 60, from the sub-buffer 602 until the end of the buffer 60, as shown by the arrow 76. That provides the final data requested by the requesting device.

Thus, the data required at the end of the data transfer to the requesting device was effectively cached in the buffer 60 until it was required. This avoids the need to transfer the data in a separate SDRAM burst, and therefore makes better use of the bandwidth of the memory bus 60.

Figure 5:
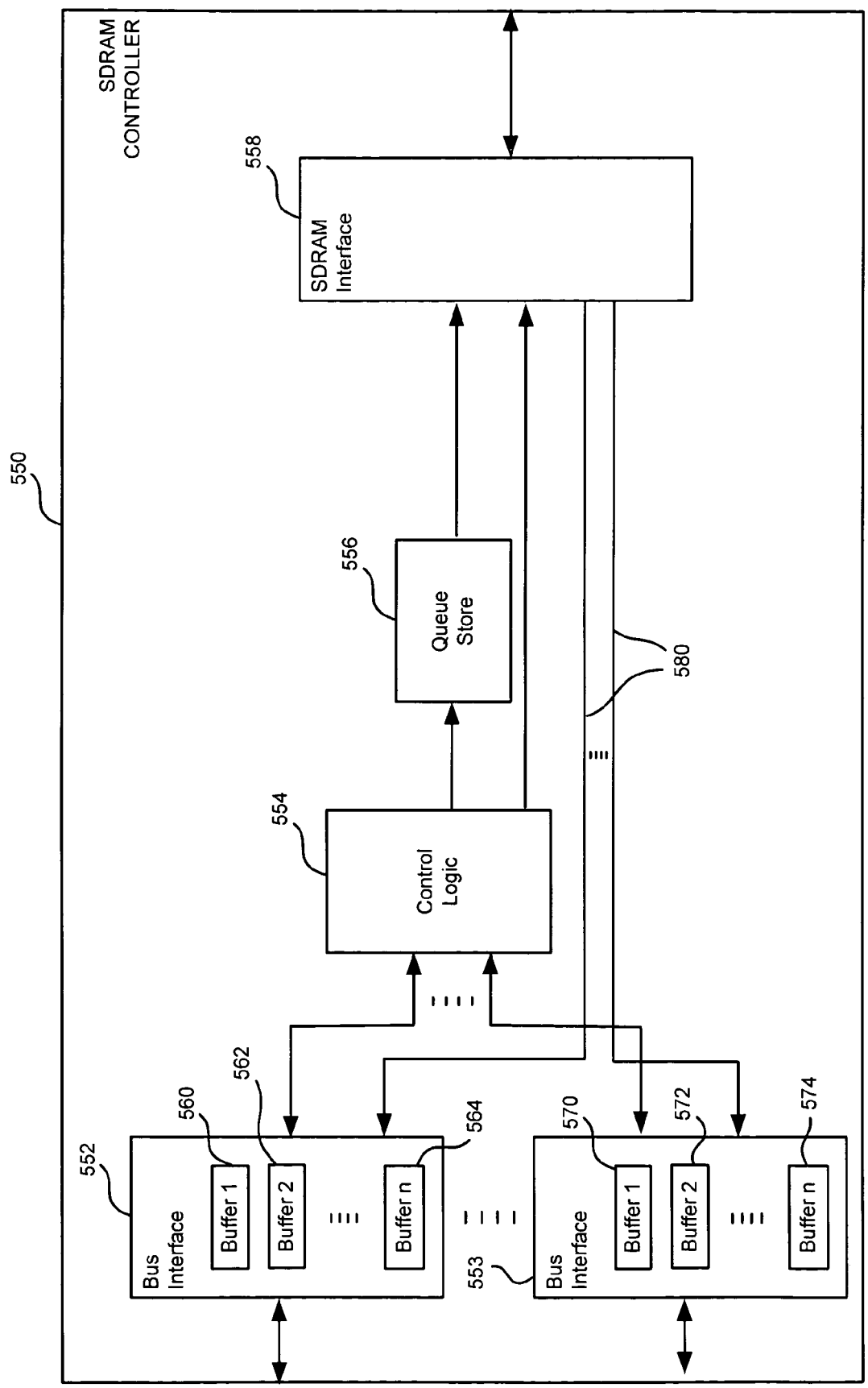
FIG. 5 is a block schematic diagram of an alternative form of SDRAM controller in the computer system of FIG. 1.

FIG. 5 shows a SDRAM controller 550, in accordance with an alternative embodiment of the invention. As before, the SDRAM controller 550 is shown in FIG. 5, and described herein, only to the extent required for an understanding of the present invention. Other features of the SDRAM controller, which are not required for that purpose, will not be described, and may be assumed to be generally conventional, as known to the person of ordinary skill in the art.

In the illustrated embodiment, the SDRAM controller 550 has multiple bus interface blocks 552, 553, for connection to respective bus master devices. Although FIG. 5 shows two bus interface blocks 552, 553, there may be any convenient number of such blocks. For example, in the system shown in FIG. 1, there may be one bus interface allocated for connection to each of the modules 25 and the CPU 27.

However, in other embodiments of the invention, there may be only one such bus interface block.

Memory access requests, received by the SDRAM controller 550 at the bus interface blocks 552, 553 are passed to a control logic block 554.

Although FIG. 5 shows the control logic block 554 as being separate from the bus interface blocks 552, 553, some or all of the functionality of the control logic block 554, as described below, can instead be provided in the bus interface blocks.

After processing in the control logic block 554, the memory access requests are placed in a queue in a queue store block 556, which may for example take the form of a first-in, first-out memory. The memory access requests from the queue are then passed in turn to a SDRAM interface block 558.

In this embodiment of the invention, each of the bus interface blocks 552, 553 contains multiple buffers. Thus, the first bus interface block 552 contains a first buffer 560, a second buffer 562, and so on, up to an nth buffer 564. The second bus interface block 553 contains a first buffer 570, a second buffer 572, and so on, up to an nth buffer 574.

Data retrieved from the memory device is returned from the SDRAM interface 558 to the requesting bus interface 552, 553 over a corresponding data line 580, and then stored in the buffers 560, 562, ..., 564 or 570, 572, ..., 574, as the case may be, under the control of the control logic 554. The data is then returned to the requesting device from the respective bus interface 552, 553.

The operation of the embodiment shown in FIG. 5 is then essentially the same as the operation of the embodiment shown in FIG. 2, as described with reference to FIGS. 3 and 4.

However, when step 312 of FIG. 3 refers to retrieving the data into buffers, this should be understood as referring to the return of the data from the SDRAM interface 558 to the requesting bus interface 552, 553 over a corresponding data line 580, and the storage of the data into the buffers 560, 562, ..., 564 or 570, 572, ..., 574, as the case may be.

The invention has been described herein with reference to particular embodiments. However, other embodiments of the invention are also possible. The scope of the present invention is therefore to be determined only by the accompanying claims.

The invention claimed is:

1. A memory controller, comprising:
   at least one bus interface, each bus interface being for connection to at least one respective device for receiving memory access requests;
   a memory interface, for connection to a memory device over a memory bus;
   a plurality of buffers in the memory interface, each of the plurality of buffers sized to store a data burst for a memory access request, each of the plurality of buffers further including a plurality of sub-buffers; and
   control logic, for placing received memory access requests into a queue of memory access requests,
   wherein, in response to a received memory access request requiring multiple data bursts over the memory bus, each of said multiple data bursts is assigned by the control logic to a respective buffer of the plurality of buffers in the memory interface, and data from each of said multiple data bursts is stored by the memory interface in the respective buffer,
   wherein, for a wrapping memory access request requiring multiple buffers of the plurality of buffers, data required for each of a beginning and an end of the wrapping memory access request are assigned to respective sub-buffers of a single respective buffer by the control logic, a beginning data and an end data for the wrapping memory access request being stored concurrently from a single data burst in the respective sub-buffers of the single respective buffer by the memory interface, the storing of the beginning and end data in the single respective buffer avoiding the need for an additional data burst to obtain the end data,
   wherein the control logic records a value of a pointer indicating a first sub-buffer of the single respective buffer storing the end data, such that the control logic is able to return to the indicated first sub-buffer to retrieve the end data from the single respective buffer, and
   wherein when accessing the single respective buffer comprising a first part and a second part to return data to the respective device from which a wrapping memory read request requiring multiple data bursts over the memory bus was received, the beginning data is read out from the first part of the single respective buffer, the second part of the single respective buffer is skipped to read out subsequent data from at least one other of said multiple buffers, and the multiple buffers are wrapped around to read out the end data from the second part of the single respective buffer.

2. A memory controller as claimed in claim 1, wherein the control logic determines whether a received read access request is a wrapping request which requires multiple memory bursts, and, if so, the control logic allocates each of said memory bursts to a respective one of said buffers.

3. A memory controller as claimed in claim 1, wherein the memory controller is a SDRAM controller, and said memory interface is suitable for connection to a SDRAM memory device over said memory bus.

4. The memory controller of claim 1 wherein each of the plurality of sub-buffers are sized to store a data beat of the data burst stored in one of the corresponding plurality of buffers.

5. The memory controller of claim 4 wherein the end data required for the wrapping memory access request is cached in one or more of the respective sub-buffers until needed for transfer in response to the wrapping memory access request.

6. In a memory controller including at least one bus interface for connection to at least one respective device for receiving memory access requests, a memory interface for connection to a memory device over a memory bus, a plurality of buffers in the memory interface, and control logic for placing received memory access requests into a queue of memory access requests, a method of retrieving data comprising:
   in response to a received memory access request requiring multiple data bursts over the memory bus, assigning each of the multiple data bursts to a respective buffer in the plurality of buffers in the memory interface, each of the plurality of buffers being sized to store a data burst for the memory access request, each of the plurality of buffers further including a plurality of sub-buffers;
   storing data from each of said multiple data bursts in the respective buffer in the memory interface;
   for a wrapping memory access request requiring multiple buffers of the plurality of buffers, assigning data required for a beginning and an end of the wrapping memory access request to respective sub-buffers of a single respective buffer to be stored concurrently from a single data burst in the respective sub-buffers of the single respective buffer in the memory interface, the storing of a beginning data and an end data in the single respective buffer avoiding the need for an additional data burst to obtain the end data;
   recording a value of a pointer indicating a first sub-buffer of the single respective buffer storing the end data; and
   using the pointer to return to the indicated first sub-buffer to retrieve the end data,
   wherein when accessing the single respective buffer comprising a first part and a second part to return data to the respective device from which a wrapping memory access request requiring multiple data bursts over the memory bus was received, the beginning data is read out from the first part of the single respective buffer, the end data is not read out from the second part of the single respective buffer, then data is read out from at least one other of said buffers, and then the multiple buffers are wrapped around and the end data is read out from the second part of the single respective buffer.

7. A method as claimed in claim 6, further comprising determining whether a received read access request is a wrapping request which requires multiple memory bursts, and, if so, performing the step of assigning each of said memory bursts to a respective one of said buffers.

8. A method as claimed in claim 6, wherein the memory controller is a SDRAM controller, and said memory interface receives data from a SDRAM memory device over said memory bus in SDRAM bursts.

9. The method of claim 6 wherein each of the plurality of sub-buffers are sized to store a data beat of the data burst stored in one of the corresponding plurality of buffers.

10. The method of claim 9 wherein the end data required for the wrapping memory access request is cached in one or more of the respective sub-buffers until needed for transfer in response to the wrapping memory access request.

11. A programmable logic device, wherein the programmable logic device includes a memory controller, comprising:
   at least one bus interface, each bus interface being for connection to at least one respective device formed within the programmable logic device for receiving memory access requests;
   a memory interface, for connection to an external memory device over a memory bus;
   a plurality of buffers in the memory interface, each of the plurality of buffers sized to store a data burst for a memory access request, each of the plurality of buffers further including a plurality of sub-buffers; and
   control logic, for placing received memory access requests into a queue of memory access requests,
   wherein, in response to a received memory access request requiring multiple data bursts over the memory bus, each of said multiple data bursts is assigned by the control logic to a respective buffer of the plurality of buffers in the memory interface, and data from each of said multiple data bursts is stored by the memory interface in the respective buffer,
   wherein, for a wrapping memory access request requiring multiple buffers of the plurality of buffers, data required for each of a beginning and an end of the wrapping memory access request are assigned to respective sub-buffers of a single respective buffer by the control logic, a beginning data and an end data for the wrapping memory access request being stored concurrently from a single data burst in the respective sub-buffers by the memory interface, the storing of the beginning and end data in the single respective buffer avoiding the need for an additional data burst to obtain the end data; and
   wherein the control logic records a value of a pointer indicating a first sub-buffer of the single respective buffer storing the end data, such that the control logic is able to return to the indicated first sub-buffer to retrieve the end data from the single buffer,
   wherein when accessing the single respective buffer comprising a first part and a second part to return data to the respective device from which a wrapping memory read request requiring multiple data bursts over the memory bus was received, the beginning data is read out from the first part of the single respective buffer, the second part of the single respective buffer is skipped to read out subsequent data from at least one other of said multiple buffers, and the multiple buffers are wrapped around to read out the end data from the second part of the single respective buffer.

12. The programmable logic device of claim 11 wherein each of the plurality of sub-buffers are sized to store a data beat of the data burst stored in one of the corresponding plurality of buffers.

13. The programmable logic device of claim 12 wherein the end data required for the wrapping memory access request is cached in one or more of the respective sub-buffers until needed for transfer in response to the wrapping memory access request.

14. A memory controller, comprising:
   at least one bus interface, each bus interface being for connection to at least one device for receiving memory access requests;
   a memory interface, for connection to a memory device over a memory bus;
   a plurality of buffers in the memory interface, each of the plurality of buffers sized to store a data burst for a memory access request; and control logic, for placing received memory access requests into a queue of memory access requests, wherein, for a wrapping memory access request requiring multiple buffers of the plurality of buffers, data required for each of a beginning and an end of the wrapping memory access request are assigned to sub-buffers of a single buffer by the control logic, and wherein the control logic records a value of a pointer indicating a first sub-buffer of the single buffer storing the end data, such that the control logic is able to return to the indicated first sub-buffer to retrieve the end data from the single buffer, wherein when accessing the single respective buffer comprising a first part and a second part to return data to the respective device from which a wrapping memory access request requiring multiple data bursts over the memory bus was received, the beginning data is read out from the first part of the single respective buffer, the end data is not read out from the second part of the single respective buffer, then data is read out from at least one other of said buffers, and then the multiple buffer are wrapped around and the end data is read out from the second part of the single respective buffer.

15. A memory controller as claimed in claim 14, wherein the control logic determines whether a received read access request is a wrapping request which requires multiple memory bursts, and, if so, the control logic allocates each of the memory bursts to one of the buffers.

16. A memory controller as claimed in claim 14, wherein the memory controller is a SDRAM controller, and the memory interface is suitable for connection to a SDRAM memory device over the memory bus.

* * * * *